United States Patent [19]
Kleifges

[11] Patent Number: 6,003,650
[45] Date of Patent: Dec. 21, 1999

[54] TORSIONAL VIBRATION DAMPER WITH A PLANETARY GEAR SET WITH AT LEAST ONE TOOTHING ELEMENT

[75] Inventor: Jürgen Kleifges, Schweinfurt, Germany

[73] Assignee: Mannesmann Sachs AG, Schweinfurt, Germany

[21] Appl. No.: 09/106,687

[22] Filed: Jun. 29, 1998

[30] Foreign Application Priority Data

Jun. 30, 1997 [DE] Germany .......................... 197 27 678

[51] Int. Cl.⁶ .................................................. F16D 13/68
[52] U.S. Cl. ...................................... 192/70.17; 475/347
[58] Field of Search ............................. 192/113.1, 70.17; 74/574; 475/347

[56] References Cited

U.S. PATENT DOCUMENTS

| | | |
|---|---|---|
| 4,800,996 | 1/1989 | Loizeau . |
| 5,713,813 | 2/1998 | Von Greyerz ........................... 475/257 |
| 5,716,300 | 2/1998 | Sammataro et al. .................... 475/347 |
| 5,766,109 | 6/1998 | Sudau ..................................... 475/347 |
| 5,816,973 | 10/1998 | Sudau et al. ............................ 475/347 |
| 5,878,856 | 3/1999 | Sudau et al. .......................... 192/70.17 |

FOREIGN PATENT DOCUMENTS

| | | | |
|---|---|---|---|
| 0 086 044 | 1/1983 | European Pat. Off. | ........ F16D 13/68 |
| 44 44 196 | 6/1995 | Germany . | |
| 2 285 109 | 12/1994 | United Kingdom | ............ F16F 15/12 |
| 2 292 596 | 2/1996 | United Kingdom | ............ F16D 13/64 |

*Primary Examiner*—Rodney H. Bonck
*Assistant Examiner*—Tisha D. Waddell
*Attorney, Agent, or Firm*—Cohen, Pontani, Lieberman & Pavane

[57] ABSTRACT

A torsional vibration damper is provided with a drive-side transmission element which engages with a driven-side transmission element via a planetary gear set. The planetary gear set includes a planet wheel mounted on a planet carrier. The planet wheel engages another element of the planetary gear set such as a ring gear. The planet wheel has a toothing at its outer circumference which engages a toothing of the ring gear. The toothing of at least one of the planet wheel and the ring gear is made from a material which obviates the requirement of lubricating the toothing engagement between the planet wheel and the ring gear.

7 Claims, 4 Drawing Sheets

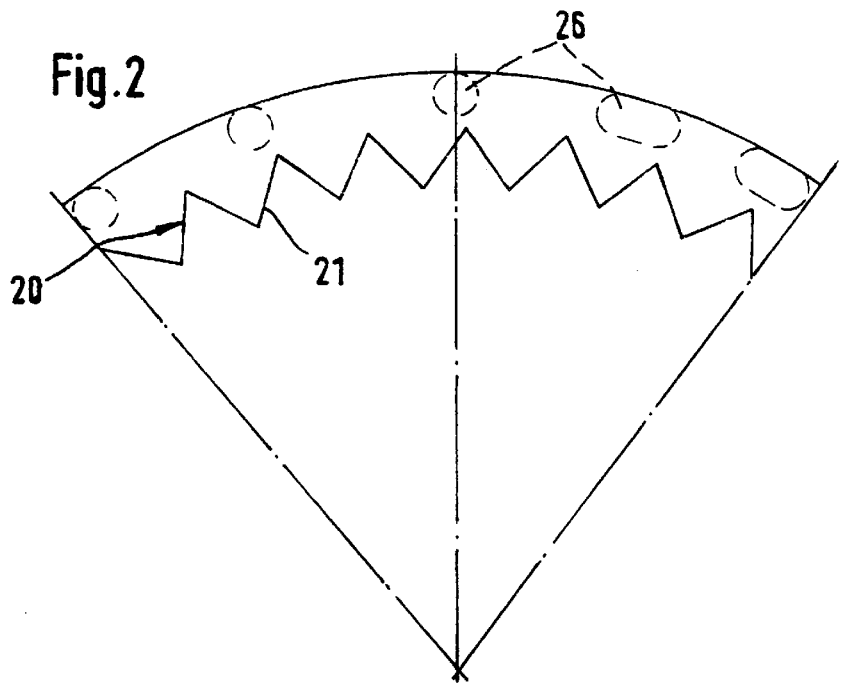
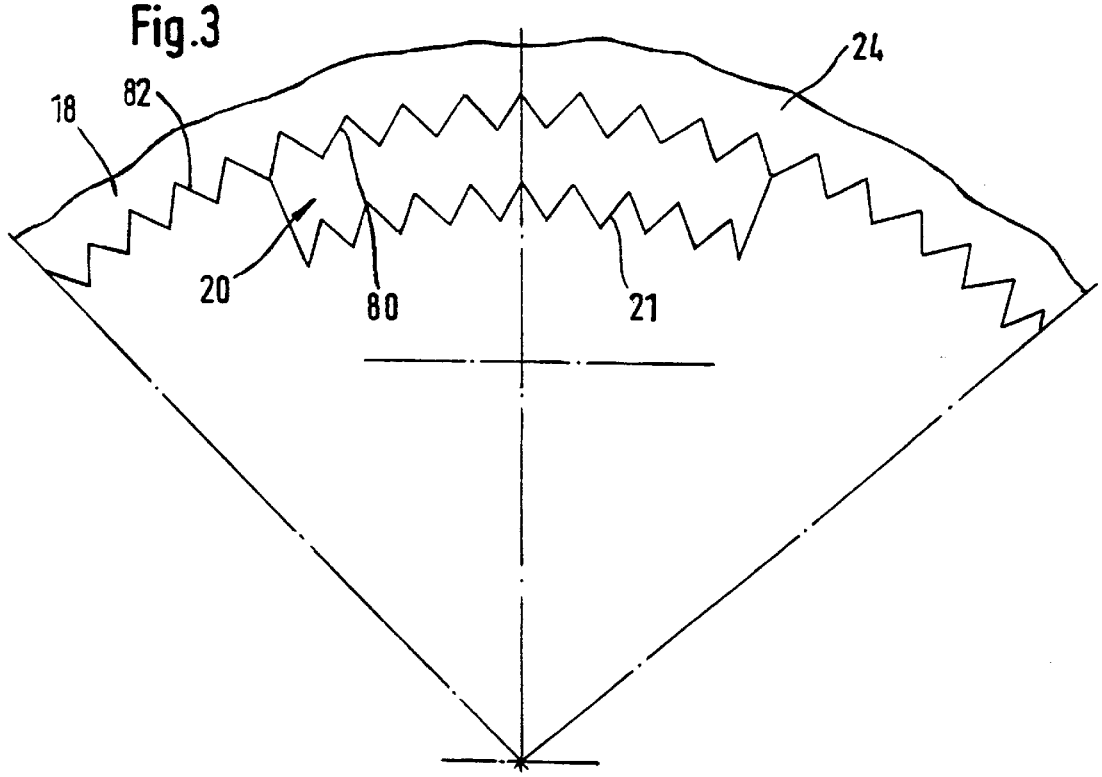

TORSIONAL VIBRATION DAMPER WITH A PLANETARY GEAR SET WITH AT LEAST ONE TOOTHING ELEMENT

BACKGROUND OF THE INVENTION

1. Field of the Invention

The invention is directed to a torsional vibration damper for use with a motor vehicle clutch with a drive side transmission element connected with a driven side transmission element via a planetary gear set.

2. Description of the Related Art

A prior art torsional vibration damper with a drive-side transmission element which engages with a driven-side transmission element via a planetary gear set is disclosed in German reference DE 44 44 196 A1, wherein a flywheel is associated with each of the two transmission elements. The planetary gear set includes planet wheels rotatably mounted on planet carriers and engage with other toothed wheels of the planetary gear set such, for example, as a ring gear. The latter is enclosed by damping elements in the form of springs which act in the circumferential direction and which are supported at one end at one of the transmission elements by the ring gear and are supported at the other end at the other transmission element by control means.

The toothed wheels of planetary gear sets in torsional vibration dampers of this kind are usually manufactured from steel. Accordingly, while these toothed wheels may be manufactured advantageously, the problem of extensive wear of the gear teeth or toothing occurs insofar as at least a portion of the toothed wheels is not arranged in a grease chamber which is at least partially filled with viscous medium as is described in the German reference. On the one hand, this viscous medium brings about a speed-proportional damping due to its displacement during movements of the transmission elements and toothed wheels. On the other hand, it also serves to lubricate the toothing and accordingly reduces the toothing wear mentioned above. A problem with this prior art device is that to effect the lubrication mentioned above, the amount of viscous medium in the grease chamber must be higher than would be required to achieve the speed-proportional damping alone. The reason for this is that the viscous medium must still reach at least the toothing region radially outside of the dedendum or root circle of the planet wheels even when it has been distributed in a ring-shape in the radial outer region of the grease chamber as a result of centrifugal force. Tests in this connection have shown that the amount of viscous medium for this purpose can be twice as much as that required for the speed-proportional damping. Therefore, the cost of the torsional vibration damper, as well as its weight, is increased unnecessarily.

A further problem in filling the grease chamber with a greater quantity of viscous medium is that viscous medium located in the toothing region is sprayed into a region located farther inward radially when the toothed wheels mesh with one another, wherein a seal in the above-mentioned region is intended to prevent the viscous medium from exiting the grease chamber. However, because of the radial proximity of the toothing location to the seal location and due to the high impact velocity of this sprayed grease, the seal does not have a sufficient operating reliability. A loss of viscous medium due to the insufficient seal results in increased toothing wear.

SUMMARY OF THE INVENTION

The object of the invention is to develop a torsional vibration damper with a planetary gear set in a grease chamber that ensures low wear in the toothing region without corresponding lubrication.

According to the invention, this object is met by toothing material having good sliding characteristics which substantially obviates the need for lubrication at the toothing.

By constructing one of the wheels of the planetary gear set in multiple parts, a first part serving as carrier (which is the material-intensive part of the respective wheel) may be manufactured from an inexpensive first material such as steel. This first part carries a second part which acts as a toothing element that is formed of a second material leading to reduced toothing wear in that it includes excellent sliding characteristics because of a low coefficient of friction. The sliding characteristics of the second material obviate the need for lubrication of the tooth engagement by a viscous medium. As a result, the filling level of the grease chamber of the torsional vibration damper may be reduced, so that the cost and weight of the torsional vibration damper is significantly reduced. Because of the low filling level, a ring of viscous medium occurs in the circumferential area of the grease chamber due to centrifugal force. However, this ring of viscous medium is at a considerable radial distance from a seal located farther inward radially for the grease chamber. Grease sprayed by the wheel reaches the seal with a low kinetic energy to the extent that sprayed grease is thrown radially inward at all due to the ring of viscous medium remaining radially outside of the tooth engagement. Thus, the reduction in the filling level of the grease chamber results in an effective sealing of the grease chamber.

Another advantage of the construction of the at least one wheel in accordance with the invention is as follows: In a planetary gear set in a torsional vibration damper, a torsional vibration introduced into one of the transmission elements due to a relative deflection with respect to the other transmission element causes an acceleration of the planet wheels, wherein the large weight of these planet wheels and a consequent high inertia counteracts fluctuations in the synchronous running of the drive persisting in the face of this acceleration, so that fluctuations in torque at the motor front are limited. When the planet wheel is fabricated in its entirety from a material having a lower specific weight than steel, such as plastic or light metal, the inertia-induced resistance built up by the planet wheel would be reduced and the vibration behavior at the motor front would not be effectively damped. In the present invention, however, the moment of inertial remains substantially unchanged because of the construction of the planet wheel with a carrier made from steel, since only the toothing element which comprises comparatively little material is produced from a material other than steel.

The multiple-part construction is even more advantageous with respect to the ring gear because the inertial behavior of the planet wheels remains entirely unaffected by it and, moreover, the loading of the toothing at the ring gear is appreciably less than that of the toothing of the planet wheel. Consequently, for the ring gear, the material for the toothing element can be selected more deliberately with a view to sliding characteristics, since the strength requirements for the root of the tooth are less exacting than that of the planet wheel. Plastic has proven to be an advantageous material in this regard, wherein the plastic may provided with sliding additives, such as Teflon, if required. However, certain metal alloys may also be used.

Different types of fasteners may be used for fastening the toothing element to the associated carrier. For example, the toothing element may be connected with the carrier by gluing. However, greater reliability is attainable when the toothing elements is fixed with respect to rotation relative to the carrier via a positive connection between the two elements. This rotationally rigid connection may be formed by corresponding projections at one of the two structural components—the toothing element or carrier—which engages in corresponding cut out portions in the other structural component part. The rotationally rigid positive connection may also be achieved by a toothing between these two structural component parts, wherein the toothing has the advantage that it is itself suitable for transmitting very high torques.

A toothing element may be provided at the ring gear for every planet wheel, wherein the element spans a circumferential distance large enough to extend at least over the meshing region between the ring gear and planet wheel. However, an annular toothing element arranged on the corresponding carrier may also be used. The annular toothing element is particularly useful with torsional vibration damper having a large quantity of planet wheels. The annular toothing element is also advantageous for reasons of strength compared to the construction with a plurality of smaller toothing elements in the circumferential direction. Whether an annular toothing element or a plurality of separate toothings is used, when these toothing elements are made of plastic, the parts are preferably injection-molded parts having the desired tooth shape in the toothing region.

The toothing element, especially when it is made from plastic, may also assume the function of an axial sliding bearing between the two transmission elements. In this embodiment, an additional axial sliding bearing may be omitted particularly when the centering of the driven-side transmission element relative to the drive-side transmission element is effected by means of a radial sliding bearing. In this way, the cost of manufacturing the torsional vibration damper is reduced even further. Moreover, the toothing element then acts as a seal preventing viscous medium from exiting the grease chamber in the radial inward direction. An axial spring which holds the toothing element in contact with the transmission element may be used as an additional seal for the above-mentioned purpose. However, in the case of a grease chamber that is sealed in the radial inward direction in this way, the toothing extends outside of the grease chamber, so that the above-mentioned problem of sprayed grease due to the displacement of viscous medium from the meshing of the teeth is avoided. The viscous medium accordingly causes a speed-proportional damping only in the radial region of the damping elements. Due to the excellent sliding characteristics of the toothing element when suitable selection of material is made, there is no contraindication for the absence of lubrication in the meshing of the teeth in this construction.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF THE DRAWINGS

In the drawings, wherein the reference characters denote similar elements throughout the several views:

FIG. 2 is a schematic view of a toothing element according to the torsional vibration damper of FIG. 1;

FIG. 3 shows another embodiment of the toothing element of FIG. 2, wherein the toothing element which is connected, via another toothing, with the carrier so as to be fixed with respect to rotation relative to it;

DETAILED DESCRIPTION OF THE PRESENTLY PREFERRED EMBODIMENTS

Figure 1:
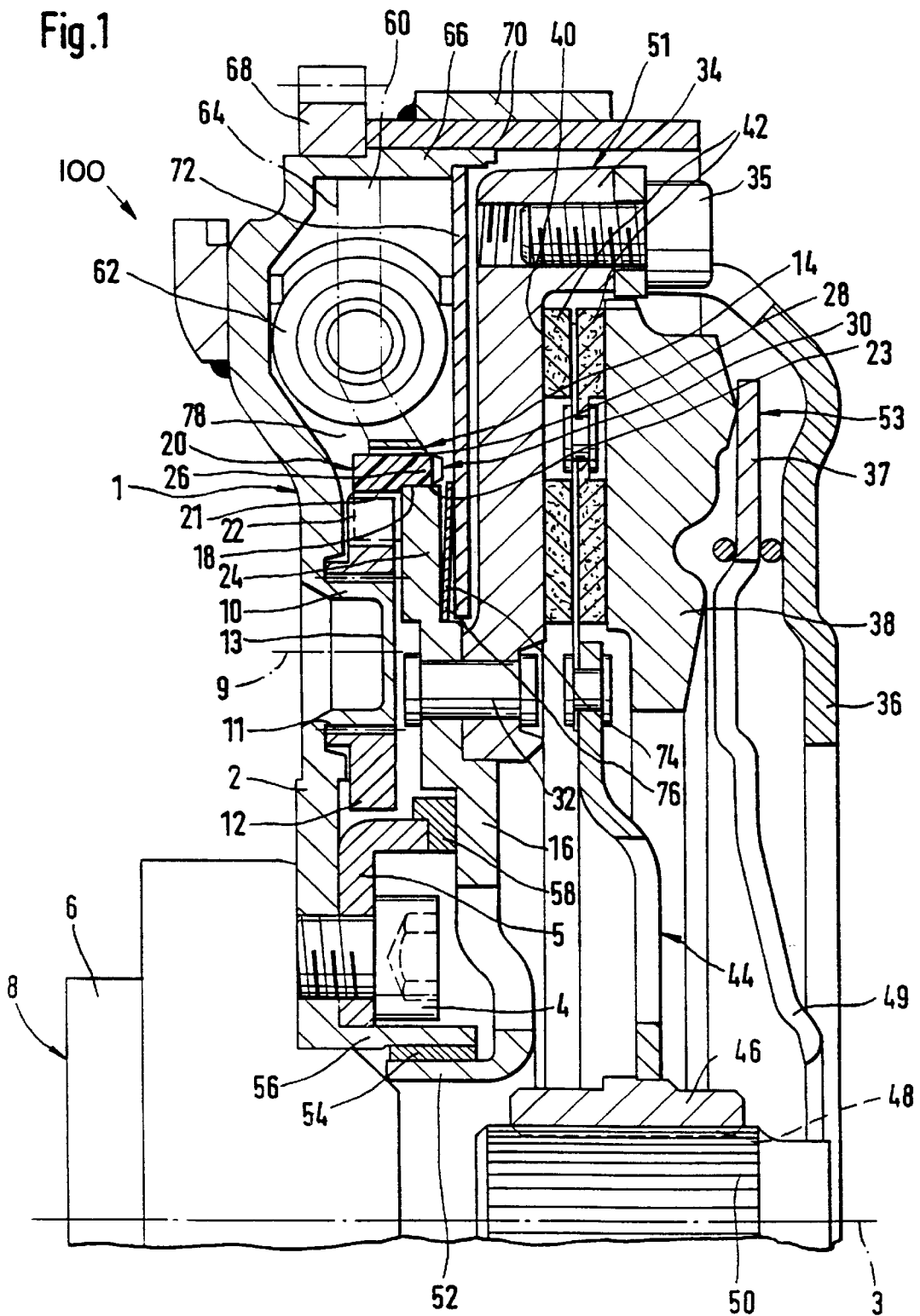
FIG. 1 is a sectional view showing the upper half of a torsional vibration damper with a planetary gear set according to the invention.

An embodiment of a torsional vibration damper 100 according to the invention is shown in FIG. 1 in which a first transmission element 1 in the form of a drive-side flywheel mass is rotatable about an axis of rotation 3. The first transmission element 1 also has a primary flange 2 having a radial inner region that is fastened to a crankshaft 6 of a drive 8 with a fastening means 4 which may comprise, for example, screws or bolts. A stop plate 5 is also fastened by fastening means 4 to the primary flange 2. An axial pressed out portion 10 is formed in a radially center region of the primary flange 2 which has a center axis 9 and is enclosed by a bearing 11 on which a planet wheel 12 is rotatably mounted. The primary flange 2, with its axial pressed out portion 10, is accordingly a planet carrier 13 of a planetary gear set 14.

In its outer circumferential region, the planet wheel 12 has a toothing 22 which engages with a toothing 21 of a ring gear 18 formed at a hub disk 16. Just radially outside of the circumference of the toothing 22 of the planet wheel 12, the hub disk 16 has an inner diameter 23 and accordingly acts as a carrier 24 for a toothing element 20 which includes the toothing 21 and the ring gear 18. To fasten the toothing element 20 to the carrier 24, projections 26 extend from the toothing element 20 toward the hub disk 16. These projections 26 engage corresponding cut out portions 28 in the hub disk 16 without play in the circumferential direction. A positive-engagement connection 30 is thus formed. When the projections 26 are constructed, for example, as clasps, they widen radially at their respective free end after passing through the associated cut out portion 28. The toothing element 20 is secured against a backward movement and is consequently secured by the locking or catching of the projections 26 in the cut out portions 28 at the carrier 24 (hub disk 16). A circumferential section of the toothing element 20 is shown in FIG. 2, although only toothing 21 is shown in the schematic view. The toothing element 20 is manufactured from a material with excellent sliding characteristics because of a low coefficient of friction such, for example, as plastic with a sliding additive such as Teflon. Accordingly, it is not necessary to lubricate the toothing.

The remainder of the component parts of the torsional vibration damper 100 will now be briefly addressed. On the radial inner side of the toothing element 20, the hub disk 16 is connected by a rivet connection 32 with a driven-side flywheel mass 34 which is connected to a clutch housing 36 via fastening elements 35. The clutch housing 36 supports a contact pressure spring 37 so that the latter loads a pressure plate 38 toward a friction surface 40 at the flywheel mass 34. The friction facings 42 of a clutch disk 44 are clamped between the pressure plate 38 and the friction surface 40. The inner radial area of the clutch disk 44 contains a hub 46 with internal toothing 48. The internal toothing 48 produces a connection with a transmission shaft 50 such that it is fixed with respect to rotation relative to it. The friction-type shift clutch 53 which is formed in this way can be disengaged and engaged in a known manner by means of a clutch release, not shown, which acts on the radial inner ends of spring tongues 49 formed on the contact pressure spring 37. A second transmission element 51 which, like the first transmission element 1, is rotatable about the axis of rotation 3 is formed by the hub disk 16 in conjunction with the driven-side flywheel mass 34 and the above-described friction-type shift clutch 53.

The hub disk 16 has a secondary hub 52 in a radially inner region which extends axially toward the crankshaft 6 for centering the second transmission element 51 relative to the first transmission element 1. The secondary hub 52 is enclosed by a radial sliding bearing 54 which is engaged in turn by a primary hub 56. The primary hub 56 is constructed at the radial inner end of the primary flange 2 and extends toward the hub disk 16. An axial sliding bearing 58 presets the axial spacing between the two transmission elements 1, 51. The axial sliding bearing is arranged axially between the hub disk 16 and the stop plate 5.

The radial outer area of the hub disk 16 has fingers 60 which extend radially outward. Damping elements 62 in the form of circumferentially extending springs are arranged between the fingers 60 and are supported at the other end at control elements, not shown, at the first transmission element 1, for example, so as to be fastened to the primary flange 2. In the radial outward direction, the damping elements 62 contact sliding shoes 64 which are supported in turn at an axial shoulder 66. The axial shoulder 66 is integral with the primary flange 2. The axial shoulder 66 has a toothed rim 68 on a radially outer side with which a starter pinion (not shown) engages, may comprise masses 70. The free end of the axial shoulder 66 carries a cover plate 72 which projects radially inward. The radial inner region of the cover plate 72 serves as a support for an axial spring 74 which acts as a seal 76 for a grease chamber 78. The seal chamber 78 is located radially outside of the seal 76 and receives the planet wheel 12/ring gear 18 tooth engagement as well as the damping elements 62 and sliding shoe 64. However, due to the advantageous sliding characteristics of the toothing element 20 described above, this grease chamber 78 is filled only slightly with viscous medium. The viscous medium settles in a ring-shaped manner in the outer circumferential area of the grease chamber 78 under the influence of the centrifugal force occurring during operation and does not extend beyond this radial inner termination point which is located at a considerable radial distance outside of the reach of the toothing element 20. The filling level of the grease chamber 78 is accordingly determined only by the proportion of desired speed-dependent damping which is produced by the viscous medium due to displacement resulting form the relative movement of the transmission elements 1, 51 with respect to one another, and not in accordance with the lubricant requirement at the toothing engagement.

When the toothing element 20 and carrier 24 are formed at the hub disk 16, all torque transmitted between the planet wheel 12 and ring gear 18 is conducted over the projections 26. To prevent an excessively high shear loading of these projections 26, the carrier 24 at the ring gear 18 may comprise a toothing 82 in which a second toothing 80 of the toothing element 20 provided radially outside of the toothing element 20 to engage the toothing 82 (see FIG. 3). The meshed connection between the toothing 80 and the toothing 82 is designed to disengage before the excessively high shear loading of the projections 26 is reached.

Figure 4:
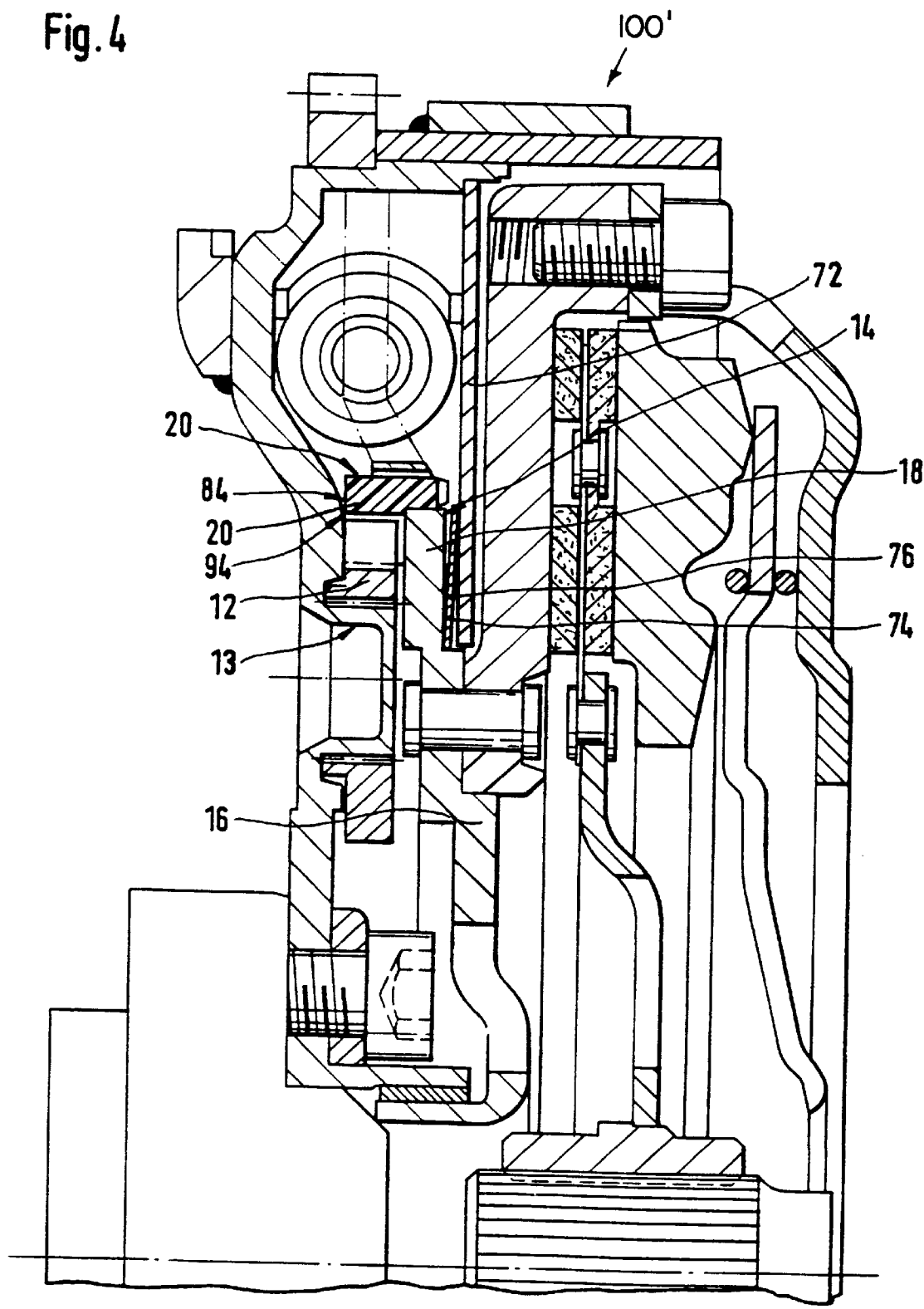
FIG. 4 shows a sectional view of a torsional vibration damper with a toothing element acting as an axial sliding bearing.

According to FIG. 4, the axial spring 74 serving as a seal 76 sets an axial distance of the hub disk 16 of the second transmission element 51 from the cover plate 72 arranged at the first transmission element 1. As a result of the toothing element 20 fastened at the hub disk 16, this toothing element 20 axially contacts at the respective radial region of extension of the primary flange 2. Accordingly, the two transmission elements 1 and 51 are adjusted axially relative to one another and the toothing element 20 accordingly functions as an axial sliding bearing 84. Because the toothing element 20 is preferably constructed from plastic, neither the toothing element 20 nor the primary flange 2 is subjected to damage due to friction. An axial sliding bearing such as that indicated in FIG. 1 by reference number 58 may be omitted in view of the construction shown in FIG. 4.

Further, the toothing element 20 in the construction shown in FIG. 4, acts at the radial inner side as a seal 94 preventing viscous medium from exiting the grease chamber 78. The gear tooth engagement between the ring gear 18 and planet wheel 12 is effected without the requirement of lubrication by the viscous medium.

Figure 5:
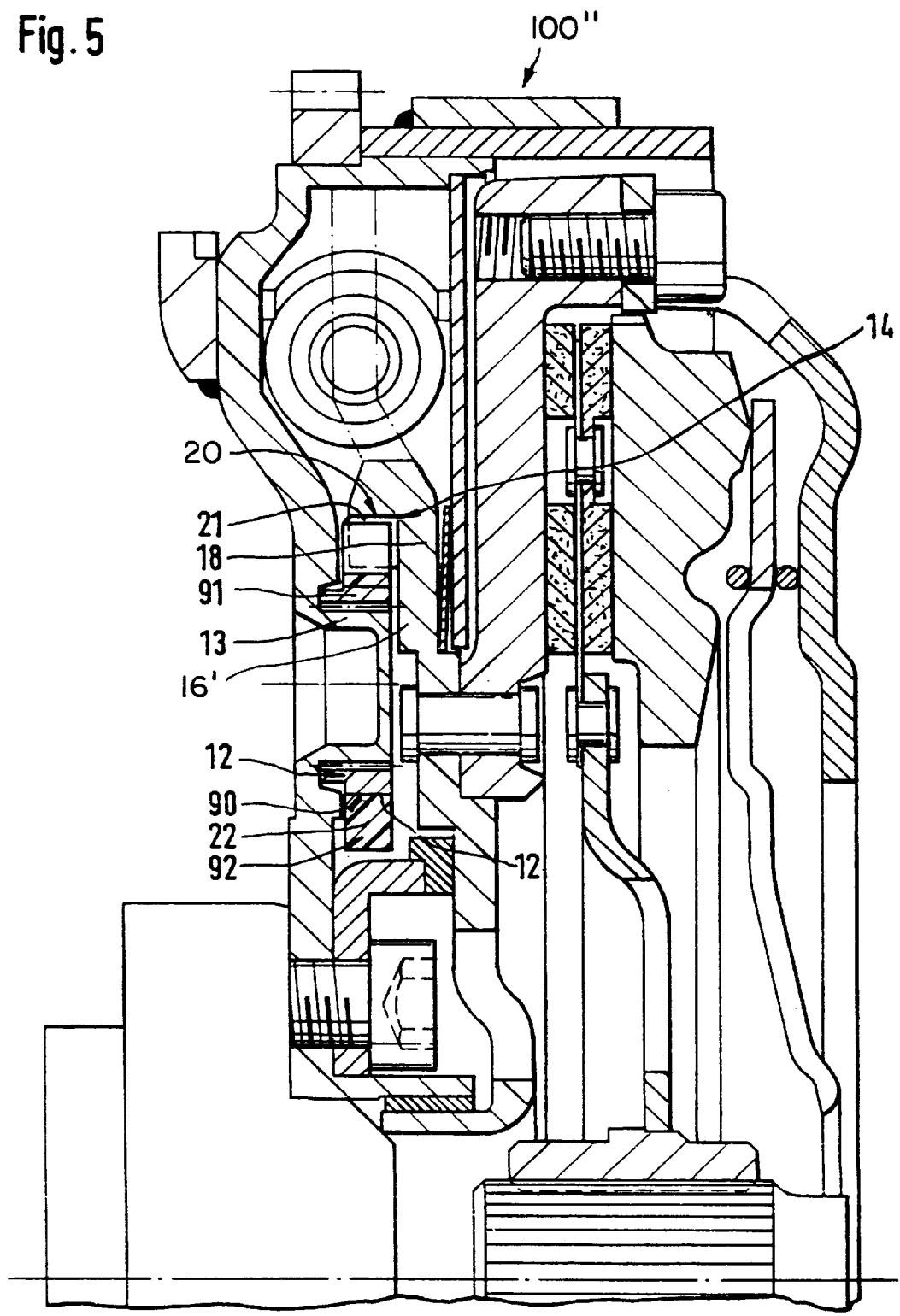
FIG. 5 shows a sectional view of a torsional vibration damper showing the construction of the toothing element at a carrier of the planet wheel.

FIG. 5 shows the planet wheel 12 in the embodiment form according to the invention with a carrier 91, which can be made of steel, and which encloses the bearing 11. The carrier 91 carries an annular toothing element 92 having its toothing 22 at the outer diameter and is preferably glued to the carrier 91 in the interest of a reduced space requirement. Requirements regarding material correspond to those mentioned above with respect to toothing element 20. An additional toothing at the toothing element 92 for a positive-engagement connection with the carrier 91 in accordance with the example of the toothing element 20 according to FIG. 3 is also advantageous, but is not shown in FIG. 5.

Instead of the separate ring gear 18 shown in the previous embodiments, FIG. 5 shows that the toothing element 20 with toothing 21 may be formed directly onto the hub disk 16. Therefore, ring gear 18 and the toothing element 20 are an integral part of the hub disk 16' and the projections 26 and cut-out portions 28 shown in FIGS. 1 and 4 are not required.

The invention is not limited by the embodiments described above which are presented as examples only but can be modified in various ways within the scope of protection defined by the appended patent claims.

I claim:

1. A torsional vibration damper for use with a motor vehicle clutch, comprising:

a drive side transmission element rotatable about a first axis of rotation;

a driven side transmission element rotatable relative to said drive side transmission element about said first axis;

circumferentially acting damping elements resiliently mounted between said drive side and said driven side transmission elements;

a planetary gear set comprising a planet gear rotatably mounted on one of said drive side transmission element and said driven side transmission element about a second axis of rotation substantially parallel to said first axis and a ring gear rotatably fixedly mounted on the other of said drive side transmission element and said driven side transmission element;

said planet gear comprising a first toothing element comprising gear teeth along an outer circumference of said planet gear; and said ring gear comprising a second toothing element having gear teeth for engaging said gear teeth of said first toothing element, wherein said second toothing element comprises projections arranged at predetermined angular intervals relative to one another with respect to said first axis, said projections extending through and engaging cut out portions of said other one of said drive side transmission element and said driven side transmission element, and said projections resiliently snap into engagement with said cut out portions thereby effecting a positive engagement between said second toothing element and said other one of said drive side transmission element and said driven side transmission element so that said second toothing element is fixed with respect to rotation relative said other one of said drive side transmission element and said driven side transmission element.

2. The torsional vibration damper of claim 1, wherein said ring gear comprises a toothing facing said second toothing element and said second toothing element comprises an additional toothing facing said toothing of said ring gear, wherein said additional toothing is in a meshed engagement with said toothing on said ring gear.

3. The torsional vibration damper of claim 1, wherein said second toothing element comprises a circumferential length spanning at least over a meshing region between said planet wheel and said ring carrier.

4. The torsional vibration damper of claim 1, wherein said planetary gear set comprises a plurality of planet wheels, said ring gear comprising a plurality of second toothing elements, wherein each said plurality of second toothing elements corresponds to one of said plurality of planet wheels.

5. The torsional vibration damper of claim 1, wherein said second toothing element is axially movably connected with said other one of said drive side transmission element and said driven side transmission element and axially contacts said one of said drive side transmission element and said driven side transmission element, said second toothing element thereby comprising an axial sliding bearing.

6. The torsional vibration damper of claim 5, wherein said contact between said second toothing element and said one of said drive side transmission element and said driven side transmission element is effective for preventing a viscous medium from passing therethrough in the radial inward direction.

7. The torsional vibration damper of claim 5, further comprising an axial spring for urging said second toothing element toward said one of said drive side transmission element and said driven side transmission element, said axial spring sealing preventing viscous medium from passing said axial spring in said radial inward direction.

* * * * *